United States Patent
Tang et al.

(10) Patent No.: US 10,990,343 B2
(45) Date of Patent: Apr. 27, 2021

(54) MOVABLE DISPLAY DEVICE

(71) Applicant: HARVATEK CORPORATION, Hsinchu (TW)

(72) Inventors: Yung-Pao Tang, Hsinchu County (TW); Yen-Chun Wang, Hsinchu (TW); Shou-Li Chang, Hsinchu (TW); Chia-Pin Chang, Hsinchu (TW); Feng-Hui Chuang, New Taipei (TW)

(73) Assignee: HARVATEK CORPORATION, Hsinchu (TW)

( * ) Notice: Subject to any disclaimer, the term of this patent is extended or adjusted under 35 U.S.C. 154(b) by 0 days.

(21) Appl. No.: 16/747,259

(22) Filed: Jan. 20, 2020

(65) Prior Publication Data
US 2020/0233627 A1    Jul. 23, 2020

Related U.S. Application Data

(60) Provisional application No. 62/795,413, filed on Jan. 22, 2019.

(51) Int. Cl.
  *G09G 5/00*    (2006.01)
  *G06F 3/14*    (2006.01)
  *G06F 1/16*    (2006.01)

(52) U.S. Cl.
  CPC .......... *G06F 3/1446* (2013.01); *G06F 1/1601* (2013.01)

(58) Field of Classification Search
  CPC .. G06F 3/14; G06F 1/16; G06F 3/038; G09G 5/00; G09G 3/30; G09G 3/36; G09F 11/00; G11C 19/00; G02F 1/1345
  See application file for complete search history.

(56) References Cited

U.S. PATENT DOCUMENTS

| | | | |
|---|---|---|---|
| 8,104,204 B1 * | 1/2012 | Syrstad | G09F 9/33 40/573 |
| 9,414,503 B2 * | 8/2016 | Lee | H05K 5/0017 |
| 2003/0217495 A1 * | 11/2003 | Nagamine | G09F 9/00 40/605 |
| 2008/0291611 A1 * | 11/2008 | Kim | F16M 13/02 361/679.05 |
| 2016/0330862 A1 * | 11/2016 | Pace | G09F 9/3026 |
| 2019/0014902 A1 * | 1/2019 | Choi | H05K 5/02 |

* cited by examiner

*Primary Examiner* — Pegeman Karimi

(74) *Attorney, Agent, or Firm* — Li & Cai Intellectual Property (USA) Office

(57) ABSTRACT

A movable display device includes a carrying module, a lifting module, a frame module and a display module. The carrying module includes a carrier unit, a base unit disposed on the carrier unit, and a plurality of positioning units disposed on the carrier unit. The lifting module is disposed on the base unit. The frame module includes a primary frame unit movably connected to the positioning units and a plurality of secondary frame units movably connected to the primary frame unit. The primary frame unit has a connecting portion connected to the lifting module. The secondary frame units are respectively located at two sides of the primary frame unit. The display module includes a primary display unit disposed on the primary frame unit and a plurality of secondary display units respectively disposed on the secondary frame units.

8 Claims, 12 Drawing Sheets

MOVABLE DISPLAY DEVICE

CROSS-REFERENCE TO RELATED PATENT APPLICATION

This application claims priority from the U.S. Provisional Patent Application Ser. No. 62/795,413 filed Jan. 22, 2019, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a display device, and more particularly to a movable display device capable of being assembled and easily moved.

BACKGROUND OF THE DISCLOSURE

LED display screens have the advantages of high brightness, low operating voltage, low power consumption, large display area, long service life, high impact resistance and stable performance. Therefore, the LED display screens are widely used in indoor or outdoor locations such as stadiums, exhibition venues, shopping malls and stations for propaganda or decorative purposes.

It is well known that a large LED display screen is formed by being spliced with a plurality of smaller display screens having the same length and width. Such a large LED display screen is difficult to be assembled and disassembled. In addition, the large LED display screen cannot be folded and thus occupies a very large space when not in use, and cannot be raised and lowered to fit different needs.

In order to overcome the above-mentioned inadequacies, how the structure of the large LED display screen can be improved to be more convenient in use is one of the important issues to be solved in this field.

SUMMARY OF THE DISCLOSURE

In response to the above-referenced technical inadequacies, the present disclosure provides a movable display device.

In one aspect, the present disclosure provides a movable display device that includes a carrying module, a lifting module, a frame module and a display module. The carrying module includes a carrier unit, a base unit disposed on the carrier unit, and a plurality of positioning units disposed on the carrier unit. The lifting module is disposed on the base unit. The frame module includes a primary frame unit movably connected to the positioning units and a plurality of secondary frame units movably connected to the primary frame unit. The primary frame unit has a connecting portion connected to the lifting module. The secondary frame units are respectively located at two sides of the primary frame unit. The display module includes a primary display unit disposed on the primary frame unit and a plurality of secondary display units respectively disposed on the secondary frame units. When the movable display device is at a folded state, each of the secondary frame units has a first predetermined angle relative to the primary frame unit, the connecting portion is close to the carrier unit, and the primary display unit and the secondary display units are at a first position.

One of the advantages of the present disclosure is that the movable display device has an increased convenience and practicality by the technical features of "the carrying module includes a carrier unit, a base unit disposed on the carrier unit, and a plurality of positioning units disposed on the carrier unit," "the lifting module is disposed on the base unit," "the frame module includes a primary frame unit movably connected to the positioning units and a plurality of secondary frame units movably connected to the primary frame unit, the primary frame unit has a connecting portion connected to the lifting module, and the secondary frame units are respectively located at two sides of the primary frame unit," "the display module includes a primary display unit disposed on the primary frame unit and a plurality of secondary display units respectively disposed on the secondary frame units," and "when the movable display device is at a folded state, each of the secondary frame units has a first predetermined angle relative to the primary frame unit, the connecting portion is close to the carrier unit, and the primary display unit and the secondary display units are at a first position."

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
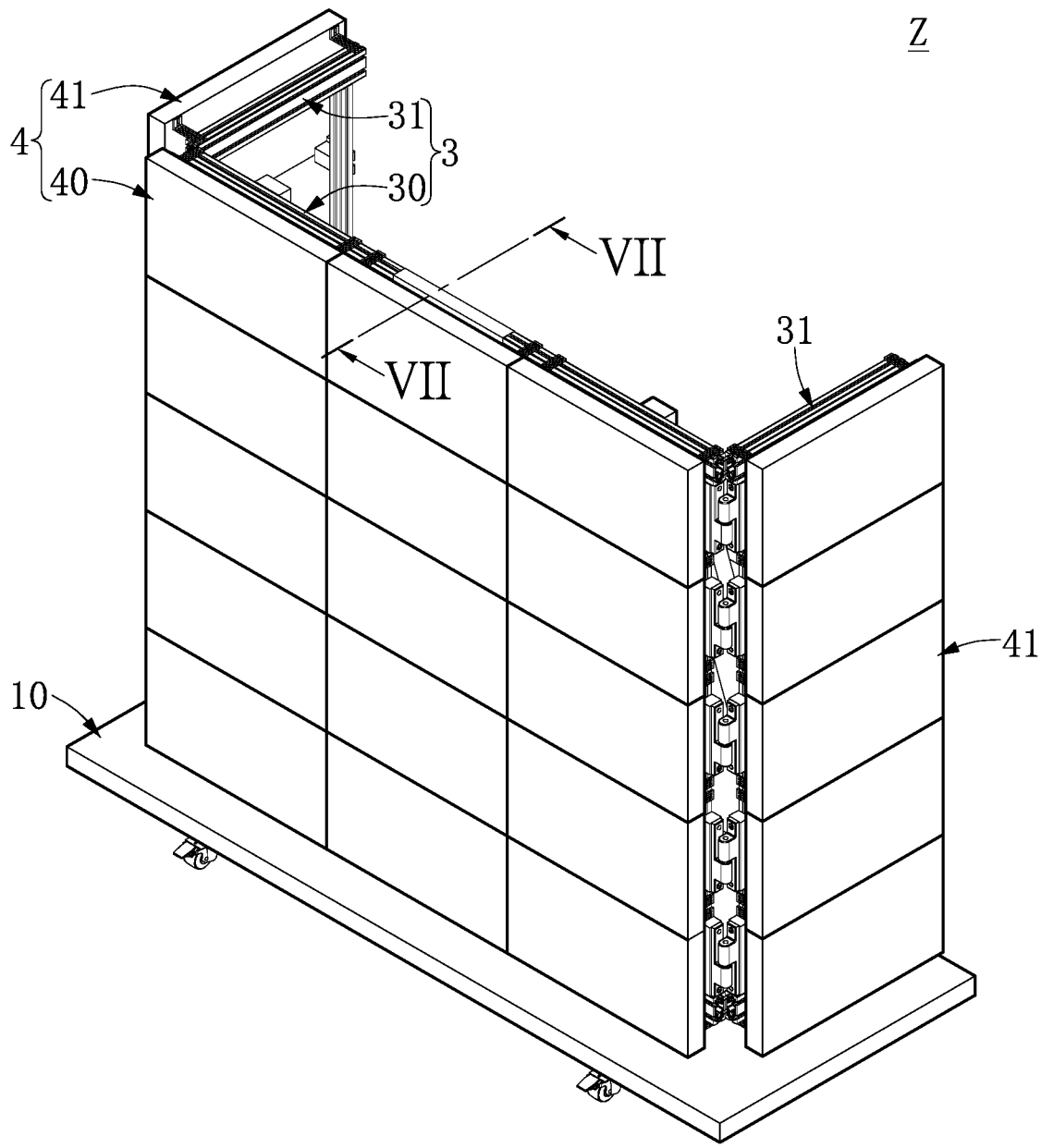
FIG. 1 is a perspective view of a movable display device according to a first embodiment of the present disclosure in a folded state.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

FIG. 1 to FIG. 6 are respectively a perspective view showing a movable display device according to a first embodiment of the present disclosure in a folded state, another perspective view showing the movable display device in the folded state, a perspective view showing the movable display device in an expanded state, another perspective view showing the movable display device in the expanded state, a top view showing the movable display device in the folded state, and a top view showing the movable display device in the expanded state. As shown in FIG. 1 to FIG. 6, the movable display device Z that includes a carrying module 1, a lifting module 2, a frame module 3 and a display module 4. The carrying module 1 includes a carrier unit 10, a base unit 11 disposed on the carrier unit 10, and a plurality of positioning units 12 disposed on the carrier unit 10. The lifting module 2 is disposed on the base unit 11. The frame module 3 includes a primary frame unit 30 movably connected to the positioning units 12 and a plurality of secondary frame units 31 movably connected to the primary frame unit 30. The primary frame unit 30 has a connecting portion 300 connected to the lifting module 2. The secondary frame units 31 are respectively located at two sides of the primary frame unit 30. The display module 4 includes a primary display unit 40 disposed on the primary frame unit 30 and a plurality of secondary display units 41 respectively disposed on the secondary frame units 31. When the movable display device Z is at a folded state, each of the secondary frame units 31 has a first predetermined angle a1 relative to the primary frame unit 30, the connecting portion 300 is close to the carrier unit 10, and the primary display unit 40 and the secondary display units 41 are at a first position.

More specifically, the movable display device Z according to the first embodiment of the present disclosure includes a carrying module 1, a lifting module 2, a frame module 3 and a display module 4. The carrying module 1 can include a carrier unit 10, a base unit 11 and a plurality of positioning units 12. The carrier unit 10 can be a general trailer or flatbed cart, the base unit 11 can be a general platform, and the positioning units 12 each can be a sliding track or sliding groove, but are not limited thereto. The base unit 11 is detachably disposed on the carrier unit 10. The lifting module 2 is detachably disposed on the base unit 11. The positioning units 12 are also detachably disposed on the carrier unit 10, and are respectively located at two sides of the base unit 11. The frame module 3 can include a primary frame unit 30 and a plurality of secondary frame units 31, which can be but are not limited to frame structures. The secondary frame units 31 can be respectively disposed at two sides of the primary frame unit 30. In the present embodiment, the secondary frame units 31 are respectively disposed at left and right sides of the primary frame unit 30, but are not limited to. In practice, the secondary frame units 31 may be respectively disposed at any two of upper, left and right sides of the primary frame unit 30. Each of the secondary frame units 31 is pivotally connected to the primary frame unit 30 by a steel hinge structure, but is not limited thereto. The display module 4 can include a primary display unit 40 and a plurality of secondary display units 41, which can be liquid crystal displays. The primary display unit 40 can consist of one or more display panels, and each of the secondary display units 41 can also consist of one or more display panels, but are not limited thereto. The primary display unit 40 is detachably disposed on the primary frame unit 30, and each of the secondary display units 41 is detachably disposed on the corresponding secondary frame unit 31. The secondary display units 31 have the same size or display area, and each of the secondary display units 31 has a smaller size or display area than the primary display unit 30.

Figure 2:
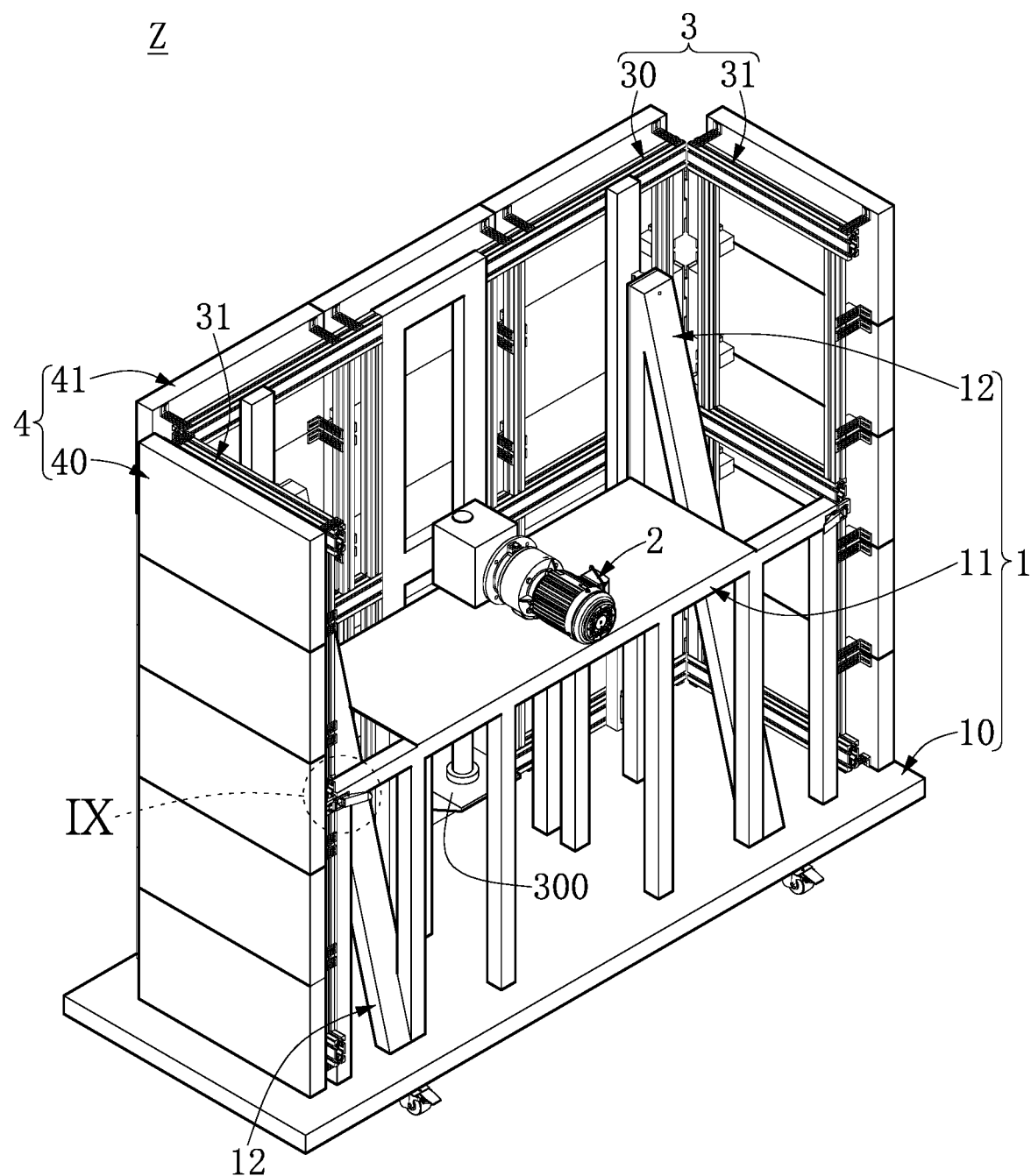
FIG. 2 is another perspective view of the movable display device according to the first embodiment of the present disclosure in the folded state.
Figure 3:
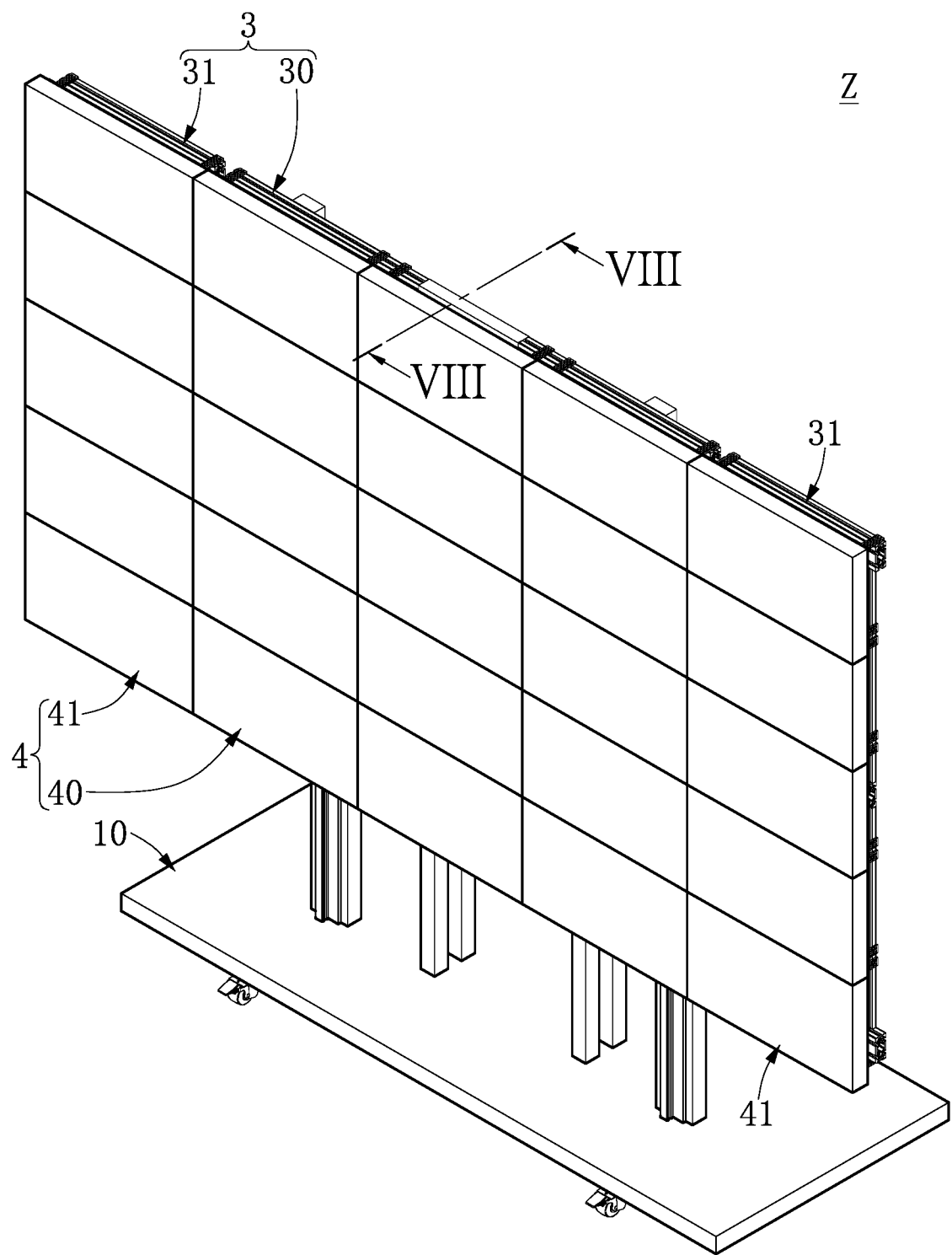
FIG. 3 is a perspective view of the movable display device according to the first embodiment of the present disclosure in an expanded state.
Figure 4:
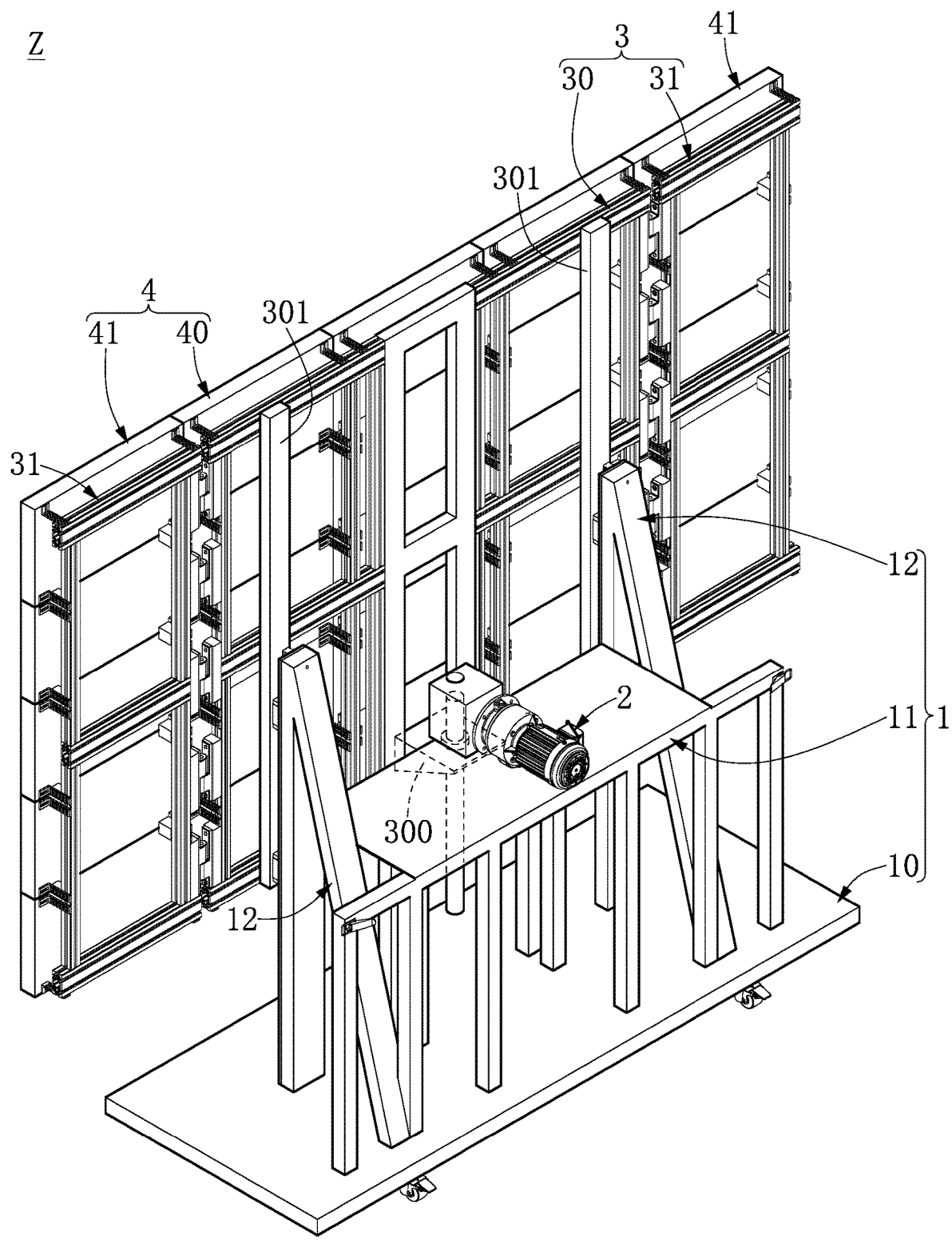
FIG. 4 is another perspective view of the movable display device according to the first embodiment of the present disclosure in the expanded state.

As shown in FIG. 1 and FIG. 2, the movable display device Z of the present disclosure can be in a folded state for storage when it is not in use. As shown in FIG. 3 and FIG. 4, when the movable display device Z is used indoors or outdoors, it can be moved in the folded state to a venue and subsequently be transitioned to an expanded state for displaying dynamic or static images.

Figure 5:
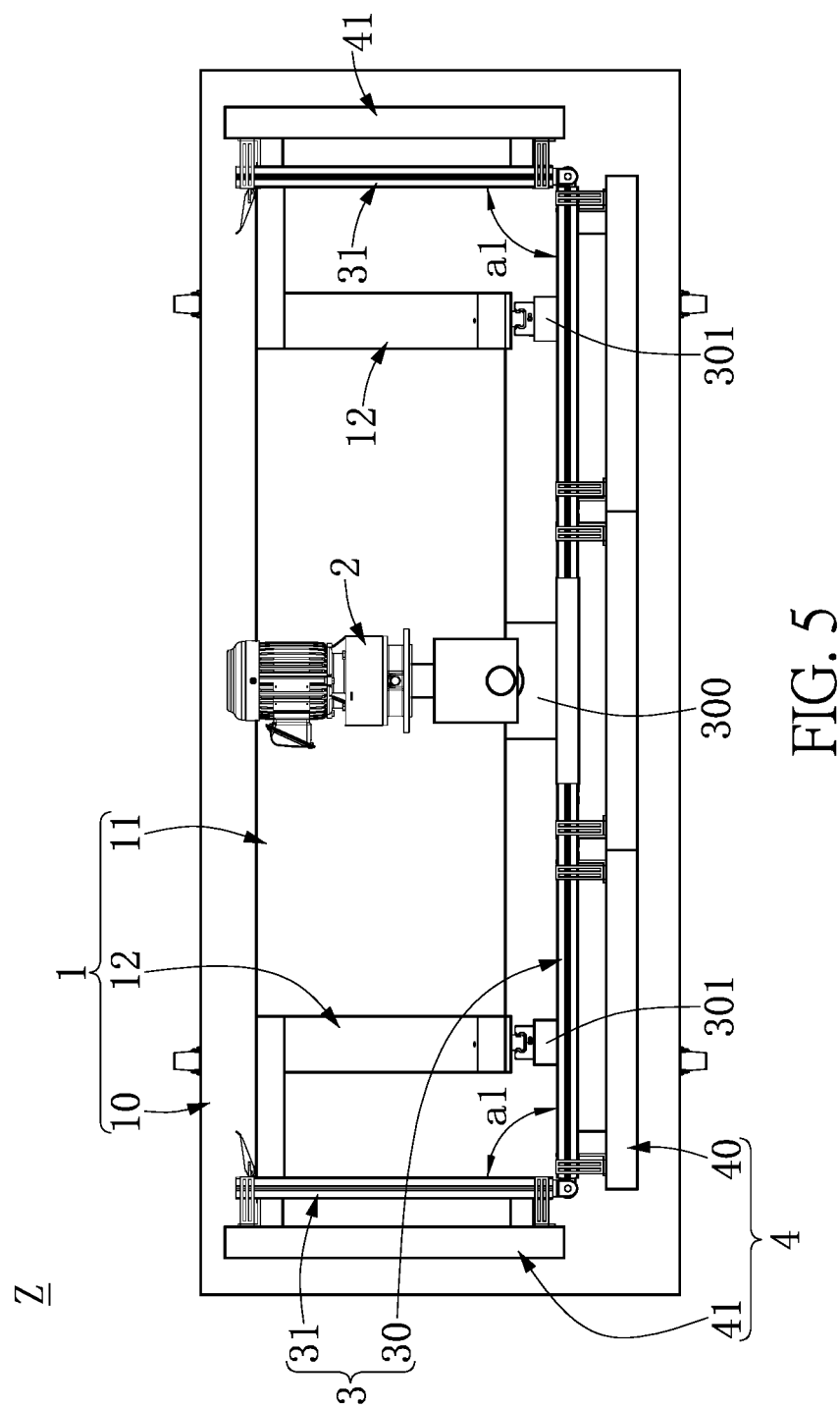
FIG. 5 is a top view of the movable display device according to the first embodiment of the present disclosure in the folded state.

More specifically, when the movable display device Z of the present disclosure is in the folded state, each of the secondary display units 31 and the primary frame unit 30 form a bent structure such as an L-shaped structure, but is not limited thereto. Accordingly, the first predetermined angle a1 is included between each of the secondary display units 31 and the primary frame unit 30. Also, each of the secondary display units 41 and the primary display unit 40 form a bent structure such as an L-shaped structure, but is not limited thereto. The first predetermined angle a1 can be between 85 degrees and 95 degrees, preferably 90 degrees, but is not limited thereto. Furthermore, the connecting portion 300 of the primary frame unit 30 is close to the carrier unit 10. The primary display unit 40 and the secondary display units 41 are at a first position, i.e., the bottoms of the primary display unit 40 and the secondary display units 41 are close to the carrier unit 10, as shown in FIG. 5.

Figure 6:
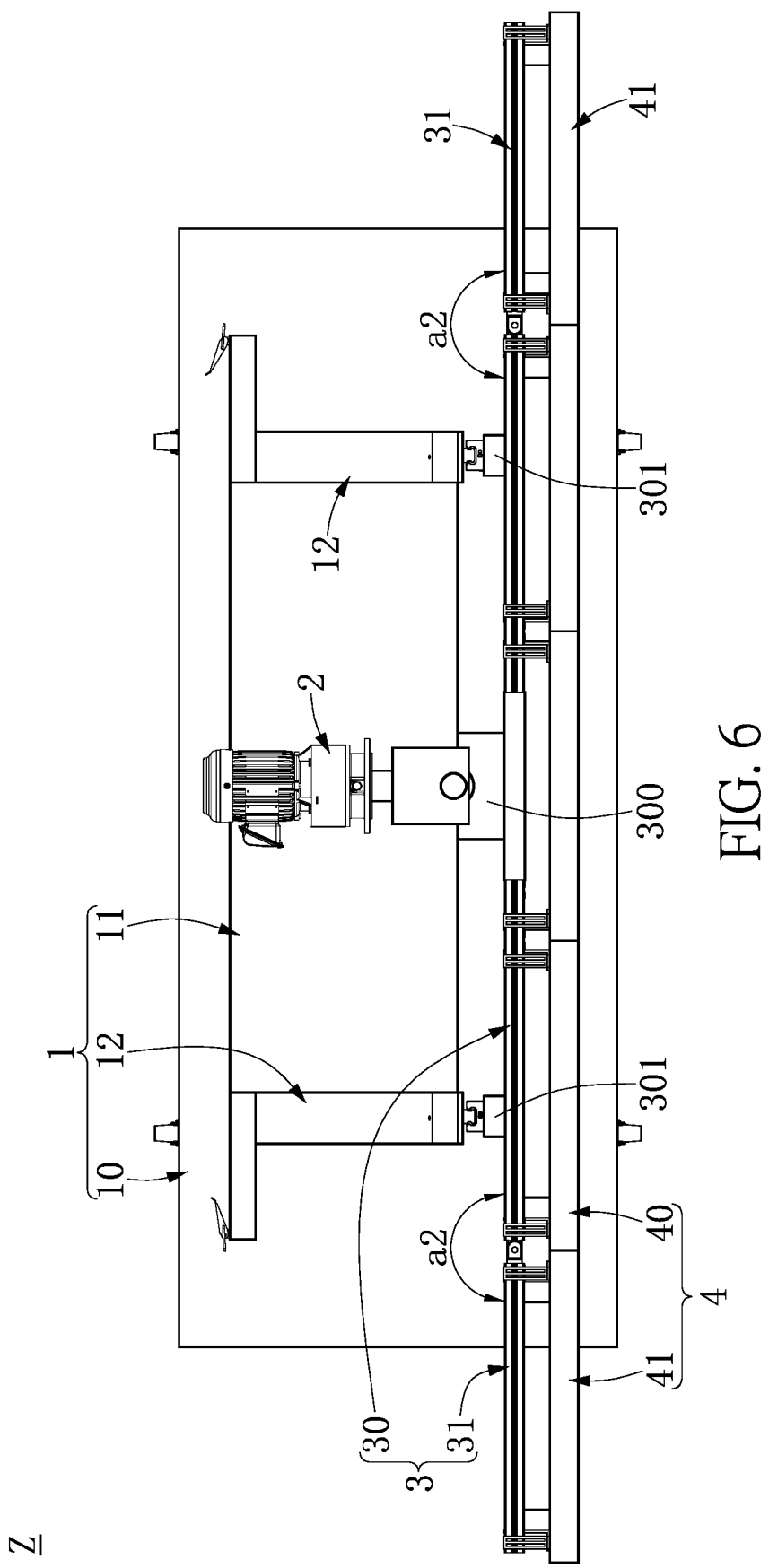
FIG. 6 is a top view of the movable display device according to the first embodiment of the present disclosure in the expanded state.

When the movable display device Z of the present disclosure is in the expanded state, each of the secondary frame units 31 has a second predetermined angle a2 relative to the primary frame unit 30. Furthermore, the connecting portion 300 is distant to the carrier unit 10 and in contact with the base unit 11, and the primary display unit 40 and the secondary display units 41 are at a second position to form a display screen. That is, each of the secondary frame units 31 can be moved to be coplanar with the primary frame unit 30, such that the second predetermined angle a2 is included between each of the secondary frame units 31 and the primary frame unit 30. The second predetermined angle a2 can be 180 degrees. In addition, the primary display unit 40 and the secondary display units 41 are at the second position, i.e., the bottoms of the primary display unit 40 and the secondary display units 41 are distant to the carrier unit 10 and close to the lifting module 2, as shown in FIG. 6. Therefore, the primary display unit 40 and the secondary display units 41 form a large display screen.

As mentioned above, the movable display device Z of the present disclosure can be quickly expanded and folded, i.e., can be quickly transitioned between the expanded state and the folded state. When the movable display device Z is in the folded state, all the modules and display units are located within the overlapping area of the carrier unit 10 for storage and transportation. Furthermore, the movable display device Z can be quickly transitioned to the expanded for displaying dynamic or static images when it is moved to a venue. Therefore, the convenience and practicality of the movable display device Z can be increased.

In addition, each of the secondary frame units 31 and the primary frame unit 30 can be fastened together to increase the structural stability of the spliced display screen and achieve a seamless visual effect.

However, the above-described details are merely exemplary, and are not intended to limit the present disclosure.

Second Embodiment

Figure 7:
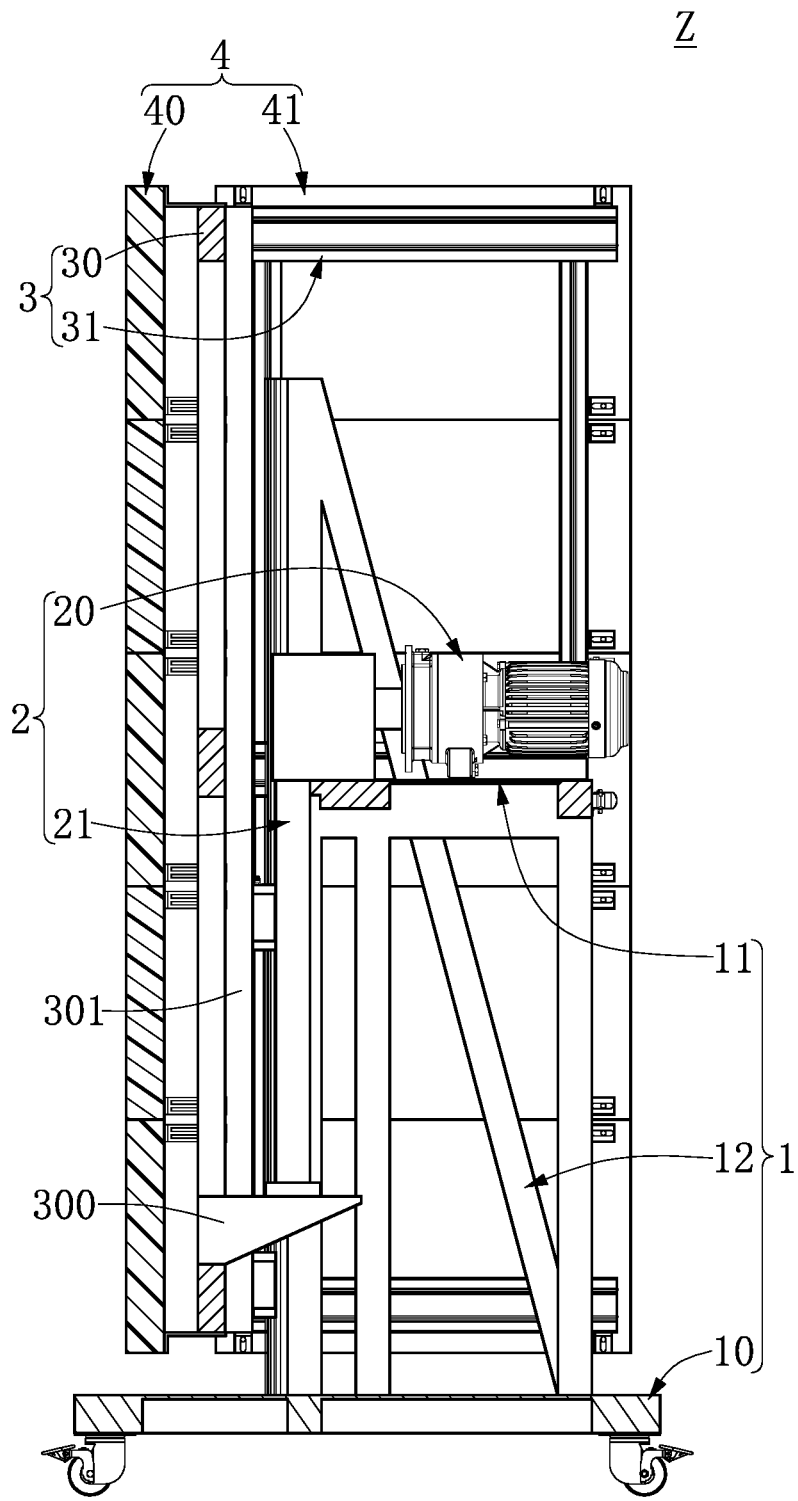
FIG. 7 is a cross-sectional view taken along line VII-VII of FIG. 1.
Figure 8:
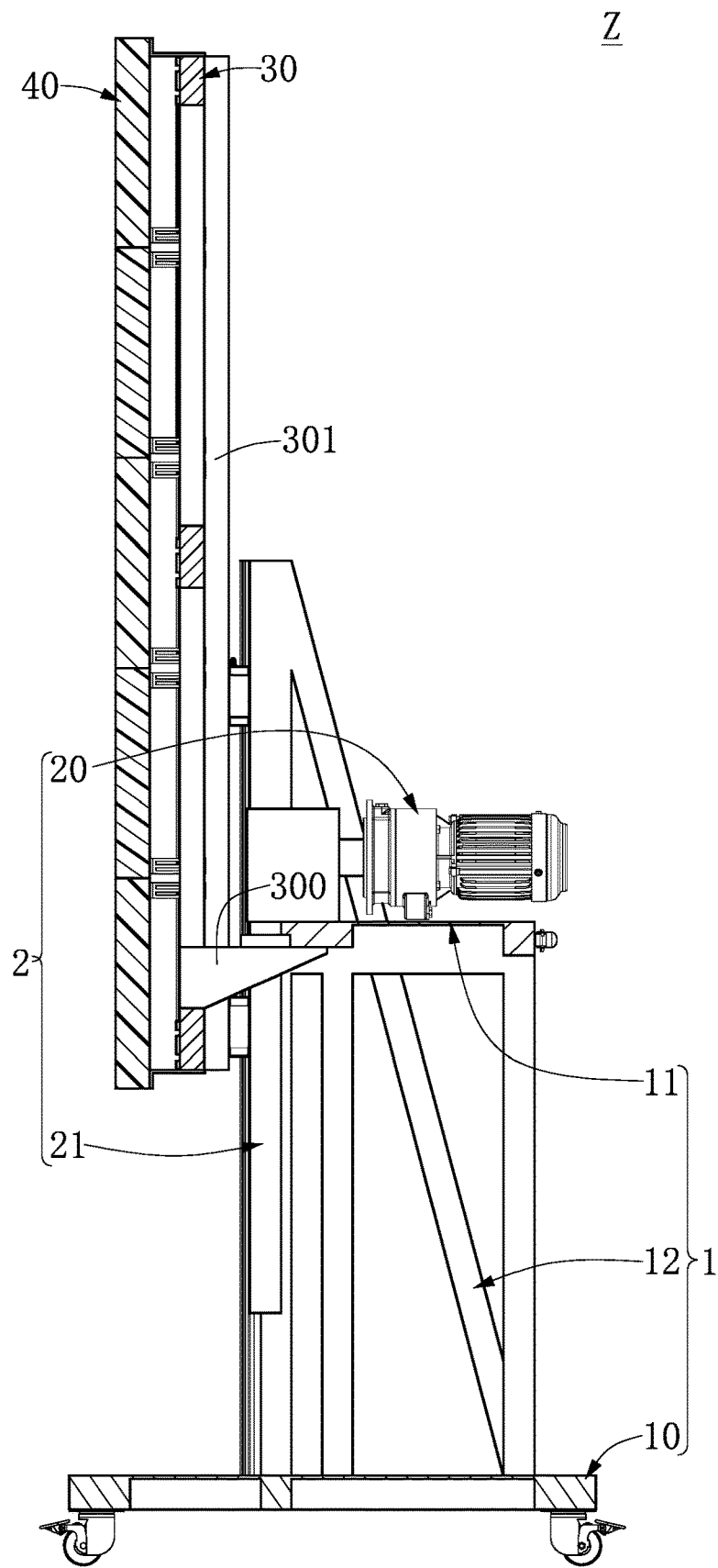
FIG. 8 is a cross-sectional view taken along line VIII-VIII of FIG. 3.
Figure 9:
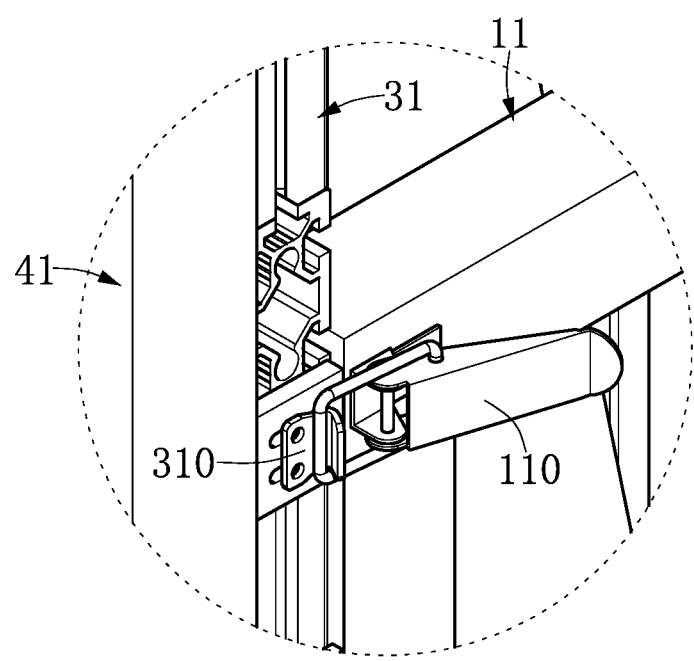
FIG. 9 is an enlarged view of a portion IX in FIG. 2.

FIG. 7 to FIG. 9 are respectively a cross-sectional view taken along line VII-VII of FIG. 1, a cross-sectional view taken along line VIII-VIII of FIG. 3 and an enlarged view of a portion IX in FIG. 2. As shown in FIG. 7 to FIG. 9, which is to be read in conjunction with FIG. 1 to FIG. 6, the movable display device Z of the present embodiment has the same elements as that of the first embodiment, and the actions of such elements are similar as described in the first embodiment and will not be reiterated herein. It should be noted that, in the present embodiment, the connecting portion 300 is driven by the lifting module 2 to move the primary frame unit 30 and the secondary display units 31 together with the primary display unit 40 and the secondary display units 41 from the first position to the second position.

For example, in the movable display device Z of the present embodiment, the connecting portion 300 of the primary frame unit 30 can be driven by the lifting module 2 for movement, so as to bring the primary frame unit 30 and the secondary display units 31 together with the primary display unit 40 and the secondary display units 41 from the first position as shown in FIG. 7 to the second position as shown in FIG. 8.

More specifically, the lifting module 2 can include a driving unit 20 disposed on the base unit 11 and an interlocking unit 21 connected to the driving unit 20 and the connecting portion 300. For example, as shown in FIG. 7 and FIG. 8, the driving unit 20 can be a driving motor and the interlocking unit 21 can be a screw structure, but are not limited thereto. The driving unit 20 is detachably disposed on the base unit 11. The interlocking unit 21 is movably connected to the driving unit 20 and passes through the based unit 11, and is connected to the connecting portion 300 of the primary frame unit 30. Accordingly, when the interlocking unit 21 is driven by the driving unit 20 for rotation, the connecting portion 300 can be actuated by the interlocking unit 21 to move the primary frame unit 30 and the secondary frame units 31.

It is worth mentioning that, the movable display device Z of the present embodiment, in which the connecting portion 300 of the primary frame unit 30 can be lifted until it abuts the base unit 11 and then be positioned, can be easily operated.

More specifically, the primary frame unit 30 has a plurality of guiding units 301, each of which is movably connected to the corresponding positioning unit 12. For example, as shown in FIG. 4, each of the guiding units 301 corresponds in position to and is movably connected to the corresponding positioning unit 12. The guiding units 301 each can be a sliding track or sliding groove, but are not limited thereto. Accordingly, when the connecting portion 300 is driven by the driving unit 20 for movement, each of the guiding units 301 can cooperate with the corresponding positioning unit 12 to enable a stable and shake-free raising or lowering movement of the primary frame unit 30.

More specifically, the base unit 11 has a plurality of first engaging portions 110, and each of the secondary frame units 31 has a second engaging portion 310. When the movable display device Z is at the folded state, each of the secondary frame units 31 is fixed to the base unit 11 by detachably engaging the second engaging portion 310 thereof with the corresponding first engaging portion 110. For example, as shown in FIG. 9, the first engaging portions 110 can be respectively disposed at two sides of the base unit 11, and a second engaging portion 310 can be disposed on each of the secondary frame units 31 and corresponds in position to one of the first engaging portions 110. The first engaging portions 110 and the second engaging portions 310 can be respective fastening structures which match with each other, but are not limited thereto. Therefore, each of the secondary frame units 31 can be fixed to the base unit 11 without shaking.

However, the above-described details are merely exemplary, and are not intended to limit the present disclosure.

Third Embodiment

Figure 10:
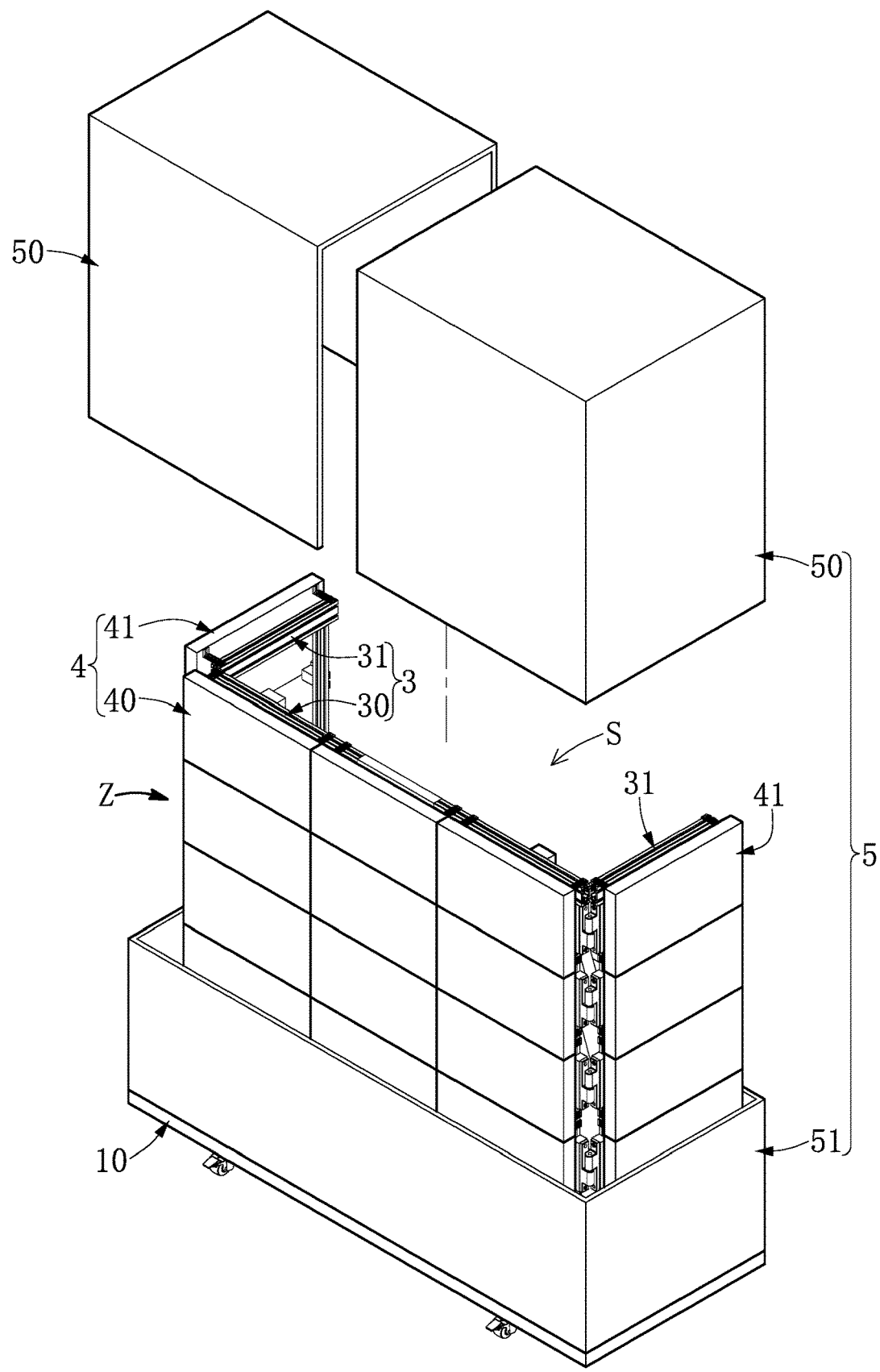
FIG. 10 is a schematic view of the movable display device according to a third embodiment of the present disclosure in the folded state.
Figure 11:
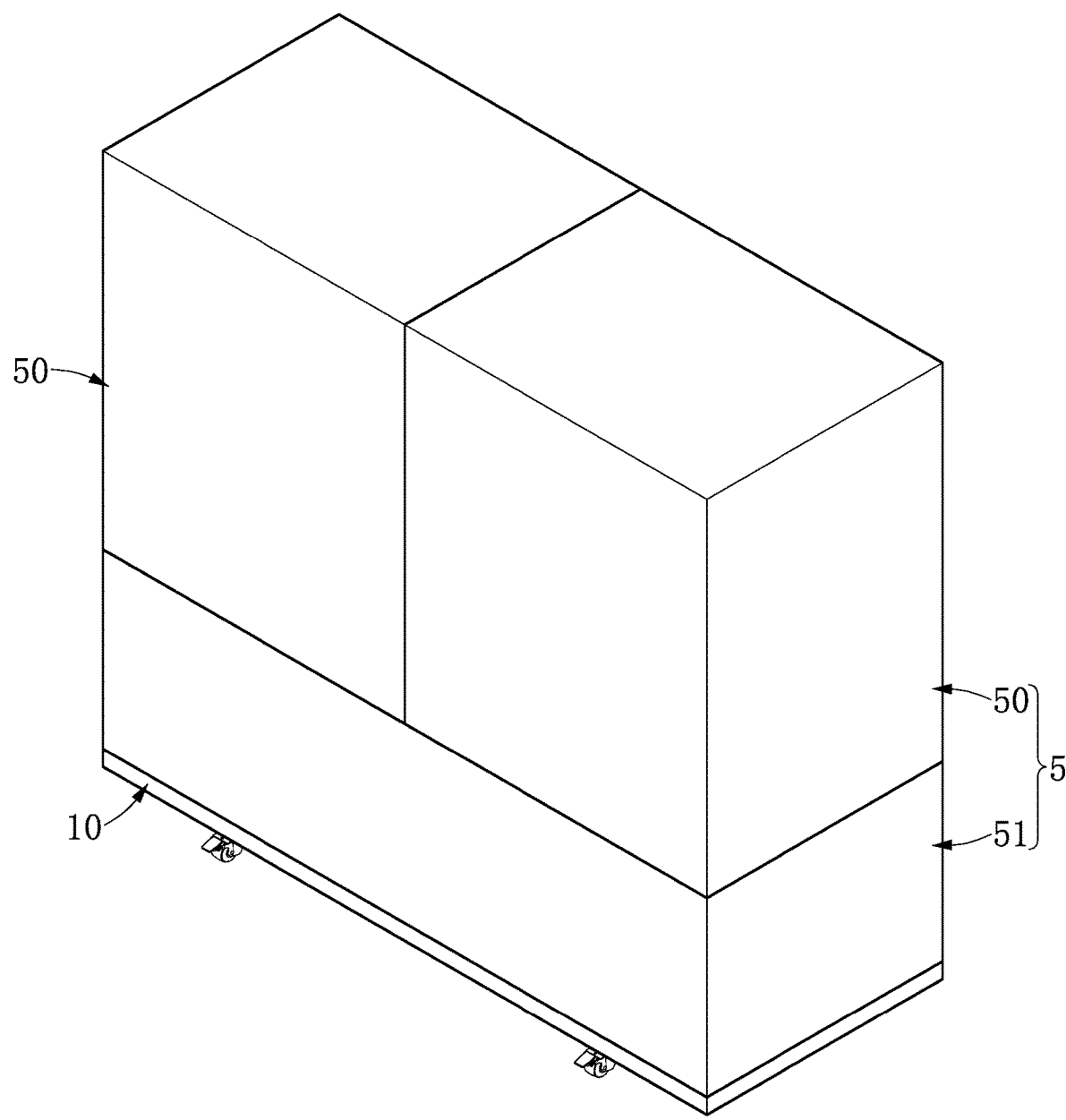
FIG. 11 is a schematic view showing an assembled casing module of the movable display device according to the third embodiment of the present disclosure.
Figure 12:
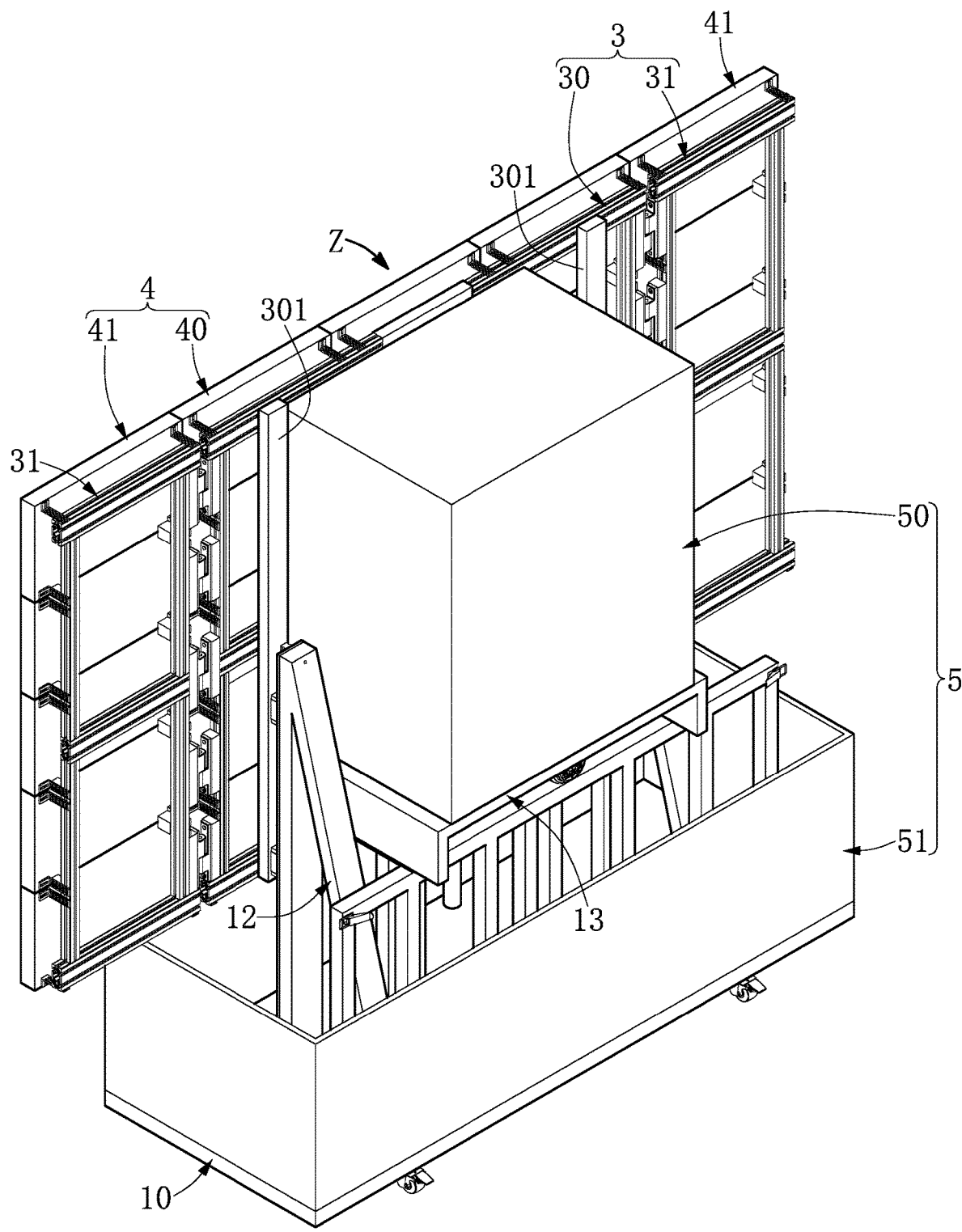
FIG. 12 is a schematic view of the movable display device according to the third embodiment of the present disclosure in the expanded state.

FIG. 10 to FIG. 12 are respectively a schematic view of a movable display device according to a third embodiment of the present disclosure in the folded state, a schematic view showing an assembled casing module of the movable display device, and a schematic view of the movable display device in the expanded state. As shown in FIG. 10 to FIG. 12, which is to be read in conjunction with FIG. 1 to FIG. 9, the movable display device Z of the present embodiment has the same elements as that of the first embodiment, and the actions of such elements are similar as described in the above embodiments and will not be reiterated herein. It should be noted that, in the present embodiment, the movable display device Z can further include a casing module 5 that includes a plurality of upper casings 50 and a lower casing 51. When the casing module 5 is at an assembled state, the lower casing 51 is detachably connected to the carrier unit 10, and the upper casings 50 and the lower casing 51 are detachably connected to each other. Furthermore, the upper casings 50 and the lower casing 51 form an accommodating space S to accommodate the base unit 11, the positioning units 12, the lifting module 2, the frame module 3 and the display module 4.

More specifically, the movable display device Z of the present embodiment can further include a casing module 5 that includes a plurality of upper casings 50 and a lower casing 51. The upper casings 50 and the lower casing 51 are each a casing structure, but are not limited thereto. The upper casings 50 and the lower casing 51 form an accommodating space S when assembled together. Accordingly, when the upper casings 50 and the lower casing 51 are assembled together on the carrier unit 10, all the elements of the movable display device Z can be accommodated in the accommodating space S to achieve a protective effect.

More specifically, the carrying module 1 can further include a supporting unit 13 that is detachably disposed on the base unit 11. When the casing module 5 is at an exploded state, the upper casings 50 and the lower casing 51 are separated from each other and the upper casings 50 are overlapped with each other and located on the supporting unit 13. For example, as shown in FIG. 12, the carrying module 1 of the present disclosure can further include a supporting unit 13 that can be a holder structure, but is not limited thereto. The supporting unit 13 can be disposed on the base unit 11. Accordingly, the upper casings 50 can be separated from the lower casing 51, and be overlapped with each other and located on the supporting unit 13. Therefore, the upper casings 50 can be found quickly for storing the movable display device Z.

However, the above-described details are merely exemplary, and are not intended to limit the present disclosure.

One of the advantages of the present disclosure is that the movable display device has an increased convenience and practicality by the technical features of "the carrying module 1 includes a carrier unit 10, a base unit 11 disposed on the carrier unit 10, and a plurality of positioning units 12 disposed on the carrier unit 10," "the lifting module 2 is disposed on the base unit 11," "the frame module 3 includes a primary frame unit 30 movably connected to the positioning units 12 and a plurality of secondary frame units 31 movably connected to the primary frame unit 30, the primary frame unit 30 has a connecting portion 300 connected to the lifting module 2, and the secondary frame units 31 are respectively located at two sides of the primary frame unit 30," "the display module 4 includes a primary display unit 40 disposed on the primary frame unit 30 and a plurality of secondary display units 31 respectively disposed on the secondary frame units 41," and "when the movable display device Z is at a folded state, each of the secondary frame units 31 has a first predetermined angle a1 relative to the primary frame unit 30, the connecting portion 300 is close to the carrier unit 10, and the primary display unit 40 and the secondary display units 41 are at a first position."

Furthermore, the movable display device Z of the present disclosure can be used indoors or outdoors by the above-mentioned technical features, and be quickly expanded or folded. The movable display device Z can be moved in the folded state to a venue and subsequently be transitioned to an expanded state for displaying dynamic or static images. After use, the movable display device Z can be quickly folded, such that the frame module 3 and the display module can be located within the overlapping area of the carrier unit 10 for storage and transportation. In addition, the movable display device Z can achieve a seamless visual effect by the casing module.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A movable display device, comprising:
   a carrying module including a carrier unit, a base unit disposed on the carrier unit, and a plurality of positioning units disposed on the carrier unit;
   a lifting module disposed on the base unit;
   a frame module including a primary frame unit movably connected to the positioning units and a plurality of secondary frame units movably connected to the primary frame unit, the primary frame unit having a connecting portion that is connected to the lifting module, and the secondary frame units being respectively located at two sides of the primary frame unit; and
   a display module including a primary display unit disposed on the primary frame unit and a plurality of secondary display units respectively disposed on the secondary frame units;
   wherein when the movable display device is at a folded state, each of the secondary frame units has a first predetermined angle relative to the primary frame unit, the connecting portion is close to the carrier unit, and the primary display unit and the secondary display units are at a first position;
   wherein when the movable display device is at an expanded state, each of the secondary frame units has a second predetermined angle relative to the primary frame unit, the connecting portion is distant to the carrier unit and in contact with the base unit, and the primary display unit and the secondary display units are at a second position to form a display screen;
   wherein the connecting portion is driven by the lifting module to move the primary frame unit together with the secondary display units from the first position to the second position.

2. The movable display device according to claim 1, wherein the first predetermined angle is between 85 degrees and 95 degrees, and the second predetermined angle is 180 degrees.

3. The movable display device according to claim 1, wherein the primary frame unit has a plurality of guiding units, each of which is movably connected to the corresponding positioning unit.

4. The movable display device according to claim 1, wherein the base unit has a plurality of first engaging portions, each of the secondary frame units has a second engaging portion, and when the movable display device is at the folded state, each of the secondary frame units is fixed to the base unit by detachably engaging the second engaging portion thereof with the corresponding first engaging portion.

5. The movable display device according to claim 1, wherein the secondary display units have the same size, and each of the secondary display units is smaller in size than the primary display unit.

6. The movable display device according to claim 1, further comprising a casing module that includes a plurality of upper casings and a lower casing, wherein when the casing module is at an assembled state, the upper casings and the lower casing form an accommodating space to accommodate the base unit, the positioning units, the lifting module, the frame module and the display module.

7. The movable display device according to claim 6, wherein the carrying module further includes a supporting unit that is detachably disposed on the base unit, and when the casing module is at a disassembled state, the upper casings and the lower casing are separated from each other and the upper casings are overlapped with each other and located on the supporting unit.

8. The movable display device according to claim 1, wherein the lifting module includes a driving unit disposed on the base unit and an interlocking unit connected to the driving unit.

\* \* \* \* \*